United States Patent [19]

Shore

[11] 4,136,502

[45] Jan. 30, 1979

[54] INFLATER SEALER MACHINE

[75] Inventor: William S. Shore, Pepper Pike, Ohio

[73] Assignee: See-Pak Corporation, Cleveland, Ohio

[21] Appl. No.: 785,238

[22] Filed: Apr. 6, 1977

[51] Int. Cl.² .................. B65B 57/00; B65B 31/06
[52] U.S. Cl. ............................... 53/493; 53/79
[58] Field of Search ................ 53/79, 112 B, 59 R

[56] References Cited

U.S. PATENT DOCUMENTS

| | | | |
|---|---|---|---|
| 2,672,268 | 3/1954 | Bower | 53/79 |
| 3,289,387 | 12/1966 | Stagmeier et al. | 53/112 B |
| 3,518,809 | 7/1970 | Ott | 53/112 A |
| 3,939,624 | 2/1976 | Gidewall et al. | 53/112 B |

Primary Examiner—Travis S. McGehee
Attorney, Agent, or Firm—Bosworth, Sessions & McCoy

[57] ABSTRACT

An inflater sealer machine is disclosed which clamps the open upper portions of a flexible container, fills the package with a quantity of gas, and subsequently seals the upper container portions closed. The clamping means of the machine comprises a pair of clamping members capable of moving together to hold the upper portions of the container together. The inflating means includes a tube which extends through the clamping members into the open upper container portions. The sealing means comprises a pair of sealing members adjacent to the clamping members and capable of moving together to seal together the upper portions of the container while the container is inflated. A pneumatic control system, including a "piggy-back" pneumatic cylinder, is also disclosed for controlling the sequential actions of the clamping, inflating, and sealing means.

5 Claims, 11 Drawing Figures

INFLATER SEALER MACHINE

BACKGROUND OF THE INVENTION

This invention relates to a machine for automatically and sequentially filling a container with gas and closing the container while it is inflated.

In U.S. patent application Ser. No. 768,976, filed Feb. 16, 1977, the present inventor disclosed a sealed flexible container which is inflated above atmospheric pressure prior to sealing. The inflated container has several advantages, including a controlled environment for the item inside the container and added protection for the item since the inflation container acts as a cushion.

In packaging items such as plants in this container, it is necessary to inflate the container and immediately close and seal the container while it is inflated. Any delay in the sealing operation will allow the container to deflate. It is also necessary to accurately seal the container over the passage through which it is being inflated at the same time or immediately after the inflating means has been inserted into the passage.

The mass production of packaged items in inflated containers requires that the packaging be accomplished quickly, easily and efficiently with a minimum of manual operations. No machines of which the inventor is aware have heretofore been capable of producing the accurate and efficient operations for mass production of items in these inflated containers.

SUMMARY OF THE INVENTION

The present invention provides a machine which quickly, accurately, and automatically inflates and seals a container with a minimum of manual operation. The container is clamped closed over the inflating means, and the sealing is accomplished adjacent to the inflating means while the container is inflated so that no appreciable deflation of the package occurs. The machine may also have a control system so that the clamping, inflating, and sealing operations are fully automated and the only manual operation required is placing an open container into the machine and removing a finished sealed container.

The machine of the present invention has a pair of clamping means which move together to hold portions of the package together, and an inflating means which extends through the clamping means into the portions of the package. A pair of sealing means adjacent to the clamping means move together to seal together the portions of the container while the container is inflated. The machine may also have a pneumatic control system for automatically actuating the inflating means and moving the clamping means and the sealing means. Preferably, the control system includes a "piggy-back" pneumatic cylinder for singly accomplishing the sequential movements of the clamping means and the sealing means.

DETAILED DESCRIPTION OF THE PREFERRED EMBODIMENTS

Figure 1:
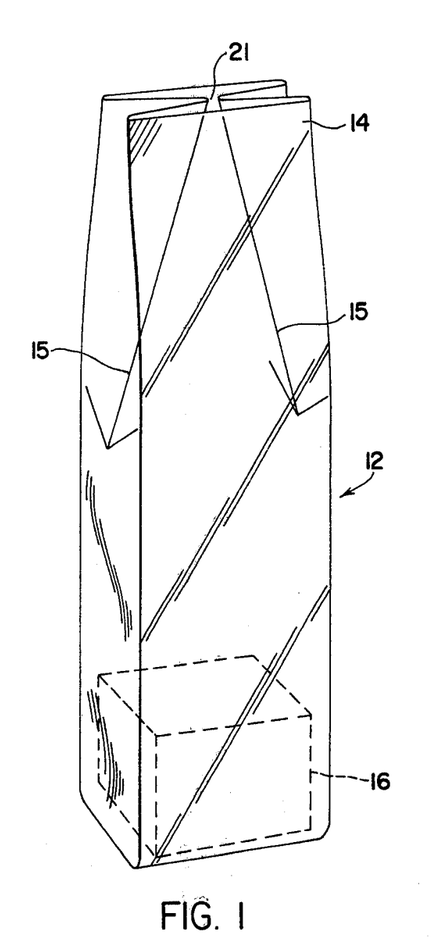
FIG. 1 is a perspective view of an open container sealed by the machine of the present invention.
Figure 2:
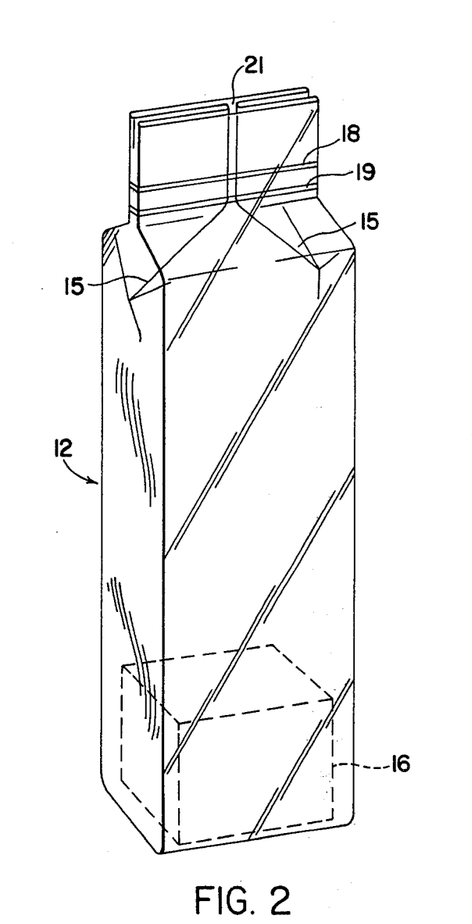
FIG. 2 is a perspective view of the container of FIG. 1 after it has been closed and sealed.

Referring more particularly to the drawings and initially to FIGS. 1 and 2, there are shown an example of a typical flexible bag-like container 12 suitable to be inflated and sealed by the machine of the present invention. The container 12 is made from a thermoplastic material such as polypropylene or polyethylene, or both, and has the same general construction as the package disclosed in U.S. patent application Ser. No. 768,976, filed Feb. 16, 1977. To close the upper portions 14 of the package 12, a pair of tucks 15 are formed therein. The tucks 15 provide an essentially flat surface for the upper portions 14 having four thicknesses of the container material which may be suitably sealed.

As disclosed in the aforementioned patent application, the container 12 requires that it be inflated with air or other gas prior to sealing. The inflation provides a controlled environment for the contents 16 of the container 12 and provides protection to the contents because the inflated package acts as a cushion to prevent damage to the contents.

FIG. 2 shows the container 12 after it has been inflated and sealed. A double seal comprising sealed portions 18 and 19 extends completely across the upper portions 14 of the container 12. At approximately the center of the upper container portions 14, is a passage 21 which may be used as a means through which the package is inflated prior to sealing. The sealed portions 18 and 19 extend across the passage 21 to hermetically seal the container and prevent the escape of gas through the passage 21.

Figure 3:
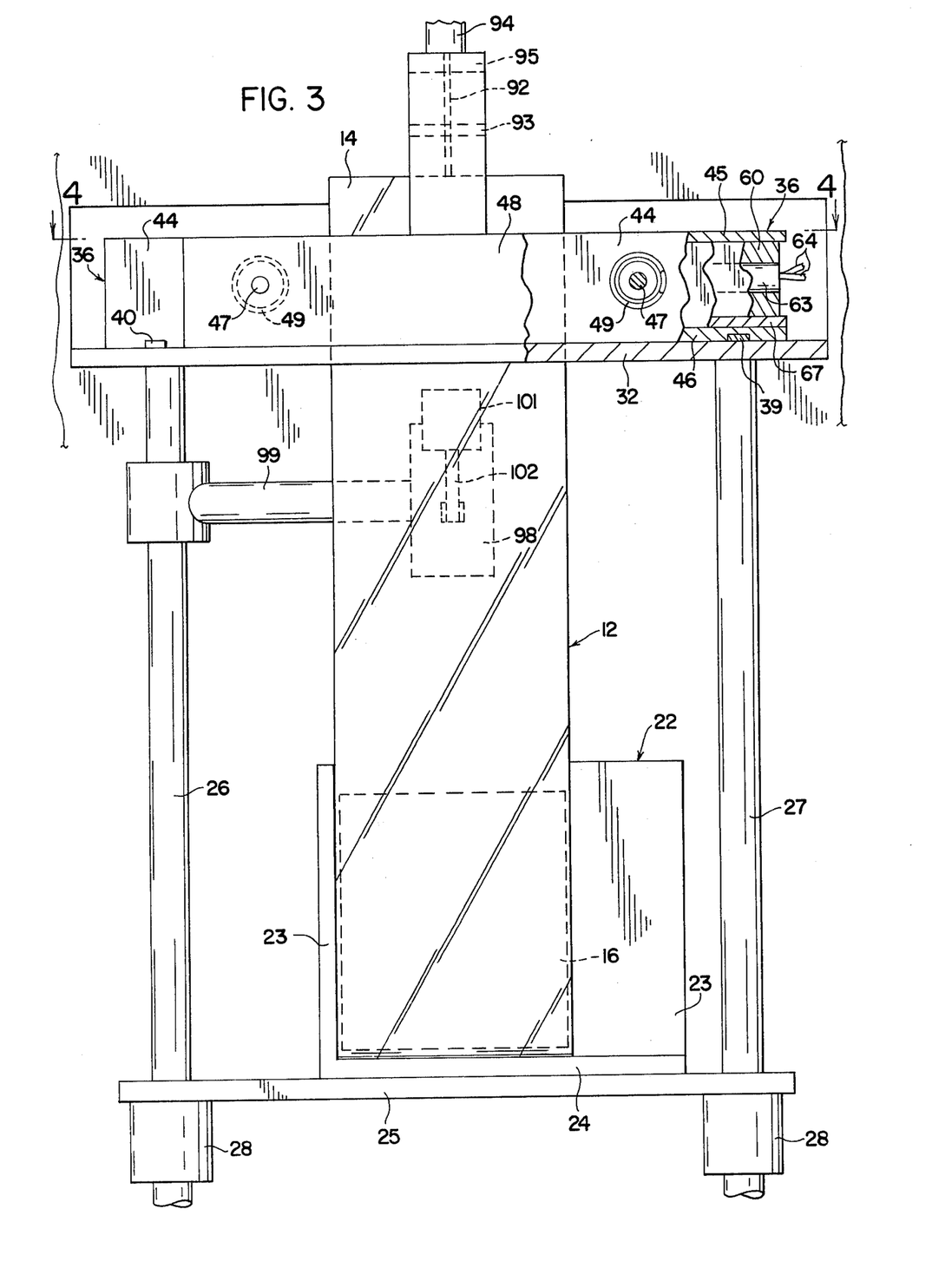
FIG. 3 is a side elevational view partially in section of the inflater sealer machine of the present invention.
Figure 4:
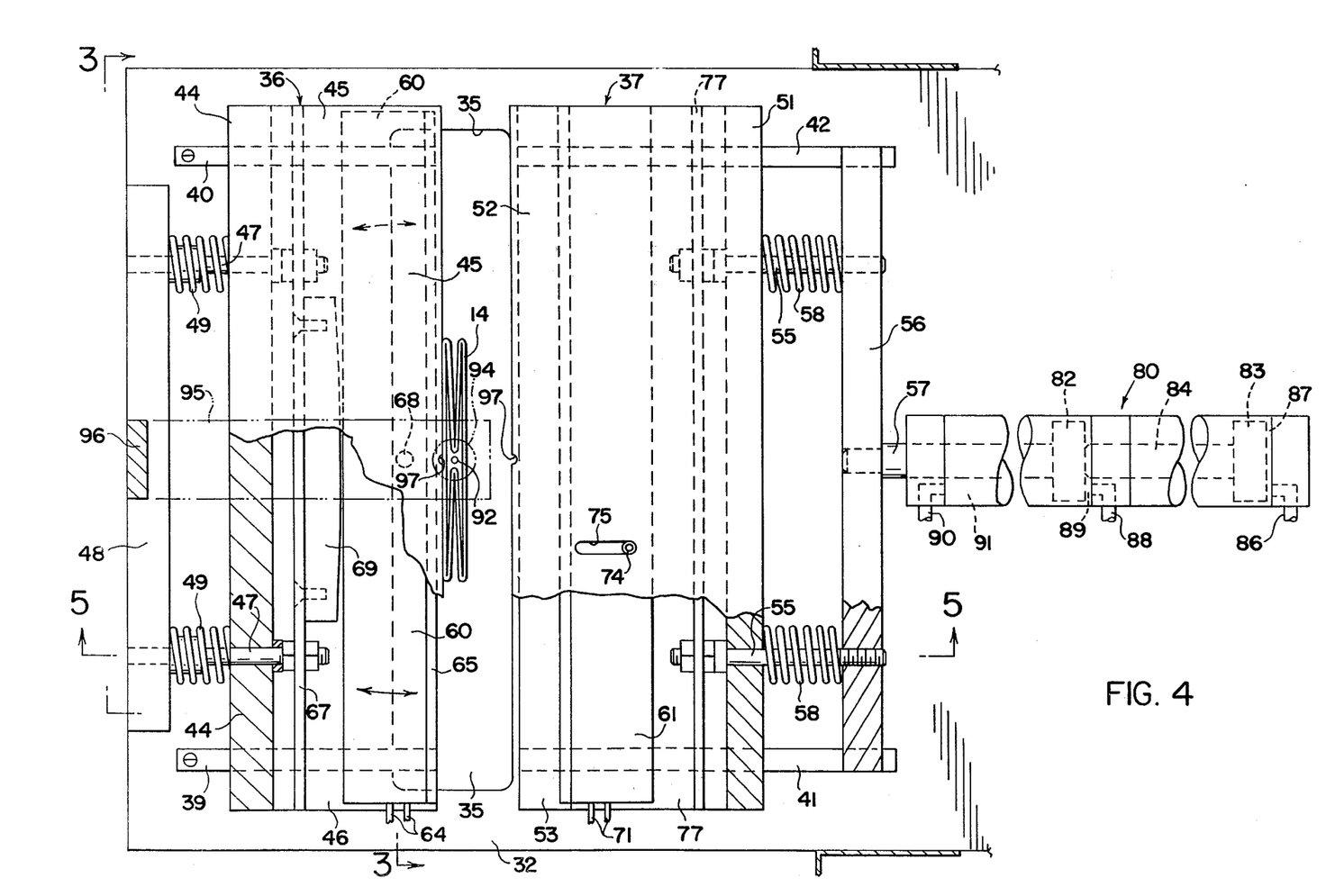
FIG. 4 is a top plan view of the machine taken along line 4—4 of FIG. 3.
Figure 5:
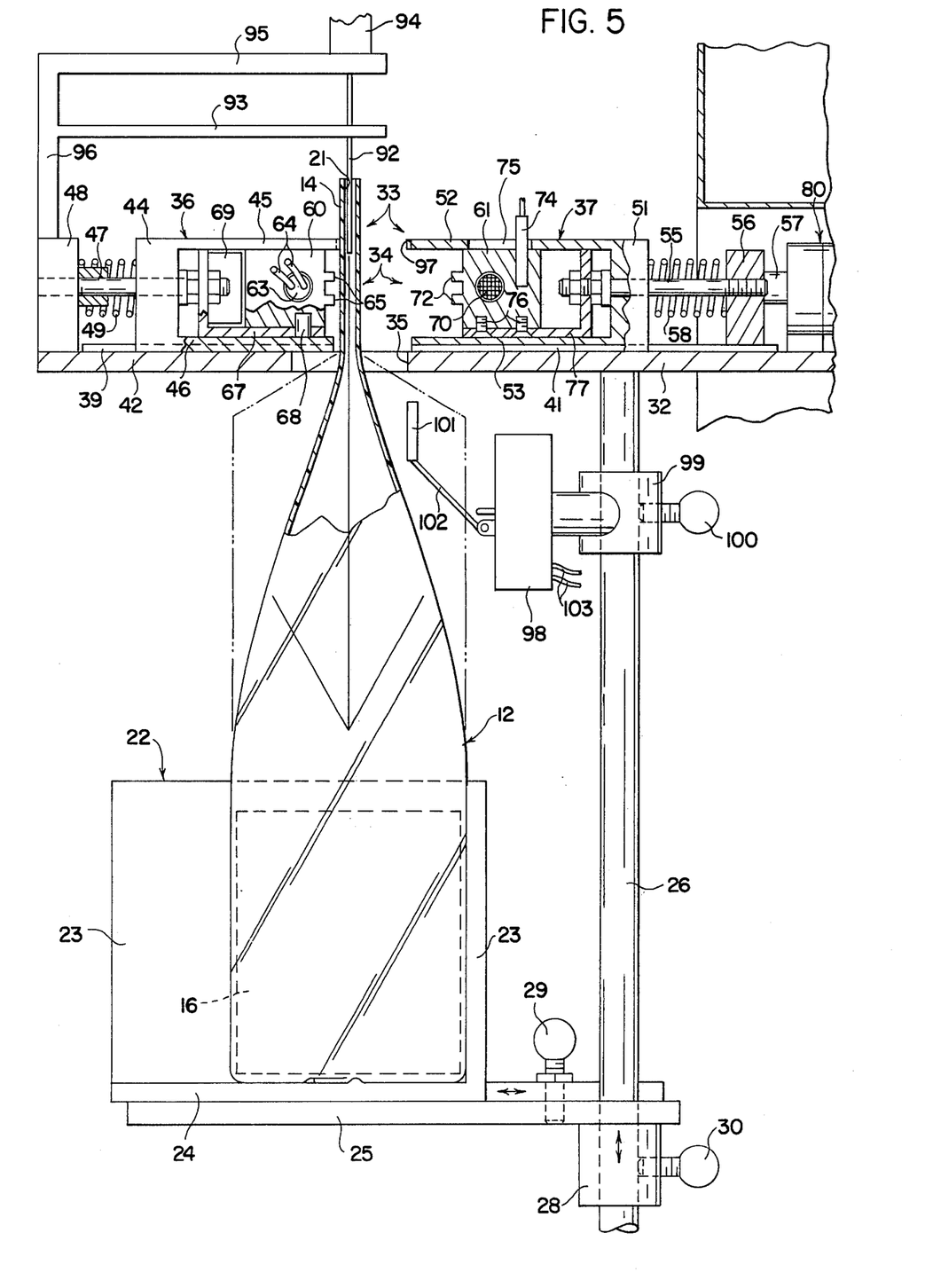
FIG. 5 is a front elevational view of the machine partially in section taken along line 5—5 of FIG. 4.

The inflater sealer machine of the present invention which automatically inflates and seals the container 12 is shown in detail in FIGS. 3, 4 and 5. The container 12 rests in a tray 22 having walls 23 and a floor 24. The tray 22 is adjustably supported on a platform 25 adjustably attached to two vertical frame bars 26 and 27 by means of brackets 28. The tray floor 24 has a setscrew means 29 for horizontal adjustment of the tray 22 on the platform 25, and each bracket 28 has a setscrew means 30 for vertical adjustment of the tray along the frame bars 26 and 27.

Mounted to the top of the bars 26 and 27 is a platform 32 supporting a clamping and positioning means 33 and a sealing means 34 supported on and capable of movement along tracks 39, 40, 41 and 42. The platform 32 has an opening 35 for the insertion of the upper container portion 14. The clamping and positioning means 33 includes two elongated U-shaped clamping and positioning members 36 and 37. The member 36 remains generally stationary on the tracks 39 and 40 during the clamping and sealing operations and has a base 44 and an upper clamping plate 45 and a lower positioning plate 46 located to the left of the upper container portion 14, as shown in the drawings. The plates 45 and 46 extend horizontally from the base 44 which is attached by means of rods 47 to a flange 48 supported on the platform 32. The base 44 and the attached plates 45 and 46 are constantly urged outwardly from the flange 48 by means of a pair of springs 49, one spring mounted on each rod 47.

The other clamping and positioning member 37 has a base 51 and an upper clamping plate 52 and a lower positioning plate 53. The member 37 is capable of substantial horizontal movement along the tracks 41 and 42 so that the plates 52 and 53 can be moved toward the plates 45 and 46, clamping the upper container portion 14 between the plates 45 and 52. The base 51 of the member 37 is attached by means of rods 55 to a bar 56 on the end of a pneumatic piston rod 57. The base 51 and the attached plates 52 and 53 are constantly urged outwardly away from the bar 56 by a pair of springs 58, one spring mounted on each of the rods 55.

The sealing means 34 includes a pair of sealing members 60 and 61 mounted within the U-shaped members 36 and 37 between the clamping plates 45 and 52 and the positioning plates 46 and 53. Between plates 45 and 46 of the member 36 is the sealing member 60 which, like the member 36, remains generally stationary during the sealing process. The sealing member 60 has a heating element 63 connected by means of electrical wires 64 to a current source (not shown) and has a pair of sealing ribs 65 which extend vertically adjacent the upper container portion 14. The sealing member 60 is pivotally attached to a mounting bracket 67 by means of a pin 68. The amount of pivotal movement of the sealing member 60 is limited by engagement of a stop 69. The bracket 67 is mounted on the end of the rods 47. The pivotal mounting of the sealing member 60 in the bracket 67 allows the sealing member to conform to the position of the other sealing member 61 during the sealing process and compensates for any wear in the sealing ribs.

The other sealing member 61 is supported between plates 52 and 53 of the member 37 and is capable of substantial horizontal movement toward the sealing member 60 to seal the upper container portion 14. The sealing member 61 has a heating element 70 also connected to a current source by wires 71 and has a pair of vertically extending sealing ribs 72. A thermocouple 74 which is inserted into the sealing member 61 and extends through a slot 75 in the plate 52 provides a means for measuring and controlling the temperature of the sealing members. The sealing member 61 is fixedly attached by fasteners 76 to a bracket 77 which is mounted on the end of the rod 55.

The horizontal movements of the clamping and positioning member 37 and the sealing member 61 are provided by a piggy-back or a double pneumatic cylinder 80 (FIG. 4). The cylinder 80 has two pistons 82 and 83. A rod attached to piston 83 engages and pushes piston 82. The rod 57 is attached to the piston 82 and produces the combined motions of both pistons 82 and 83. A pneumatic line 86 supplies air for the chamber 87 behind piston 83 while a line 88 supplies air for the chamber 89 behind piston 82, and a line 90 connects with the chamber 91 in front of the piston 82.

The means for inflating the package 12 with air or other gas includes a tube 92 (FIG. 5) which extends downwardly into the passage 21 of the upper container portion 14. The tube 92 is positioned in a cantilevered supporting member 93 and connected to an air hose 94 supported in another cantilevered member 95. Cantilevered supporting members 93 and 95 extend from an upwardly projecting member 96 mounted to the flange 42 on the platform 32. The upper clamping plates 45 and 52 are provided with notches 97 to provide clearance for the downwardly projecting tube 92.

A microswitch 98 is also mounted on the vertical frame bar 26 by means of a bracket 99 which is adjustable vertically along the bar by a setscrew means 100. The microswitch 98 has a sensing bar 101 at the end of a projecting actuatinhg arm 102 connected to suitable switching means and is connected by electrical wires 103 to a control means.

The operation of the inflater sealer machine of the present invention in inflating the container 12 and sealing the upper container portion 14 can be observed in the sequence of drawings of FIGS. 5–8. In FIG. 5, an open container 12 is placed in the tray 22 with the upper container portion 14 extending through the opening 35 in the platform 32 and upwardly around the tube 92, so that the tube 92 projects downwardly through the passage 21 in the upper container portion 14. The movable plates 52 and 53 and sealing member 61 are in their fully retracted positions. The sensing bar 101 on the actuating arm 102 of the microswitch 98 extends fully outwardly and is not contacted by the uninflated container 12.

Figure 6:
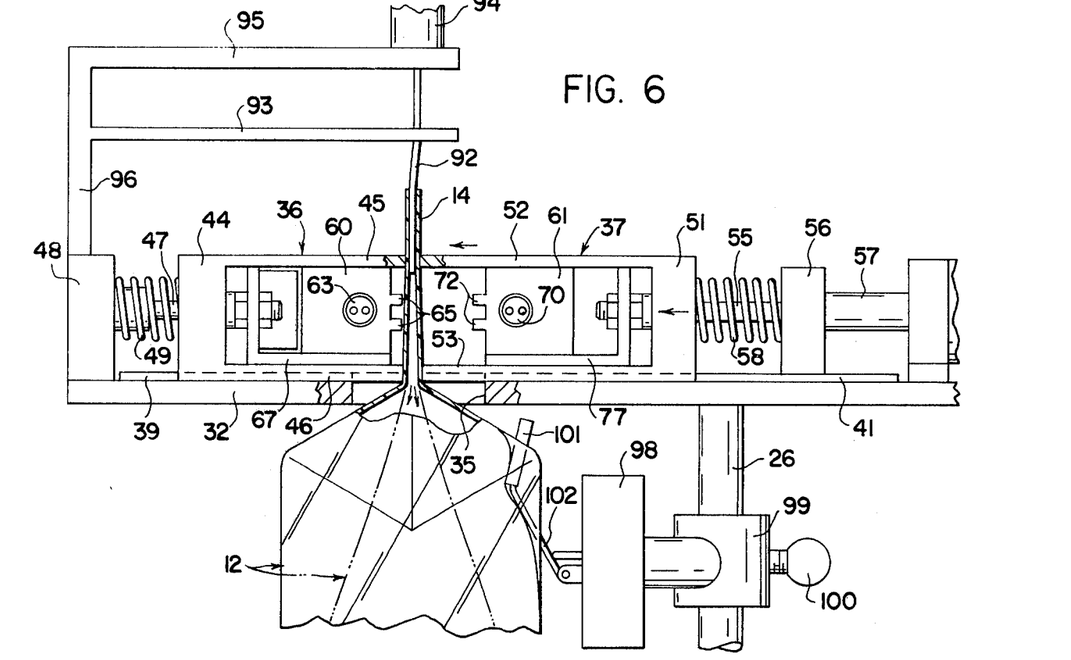
FIG. 6 is a side elevational view similar to FIG. 5 showing the machine as the container is being clamped and inflated.

In the next stage in the sequence of operation of the machine, shown in FIG. 6, the package is clamped and inflated. The clamping and positioning of the upper container portion 14 between the plates 45 and 52 and between the plates 46 and 53 is accomplished by actuation of the pneumatic cylinder 80. Air is supplied through pneumatic line 86, filling chamber 87, and advancing the piston 83 and the attached rod 84. The rod 84 pushes the piston 82, and its attached piston rod 57, which advances the bar 56 and the rods 55. The advancement of the bar 56 causes the springs 58 to push the member 37 forward along the tracks 41 and 42. This forward movement continues until the upper clamping plate 52 abuts the upper clamping plate 45. The movement causes the plate 45 and the rest of the member 36 to be pushed back slightly, compressing the spring 49 and causing the tube 92 to bend slightly. It is thus necessary that the tube 92 be flexible to accommodate this motion. Any additional movement of the bar 56 and the rod 55 is absorbed by the springs 49 and 58, so that the plates 45 and 52 remain in abutment. As shown in FIG. 6, the lower plates 46 and 53 do not abut each other, providing an opening therebetween for the passage of gas received through the tube 92.

After the upper container portion 14 has been clamped between the plates 45 and 52, the container 12 is inflated with a supply of air or other gas supplied from the hose 94 through the tube 92. When the container is inflated, it contacts the sensing bar 101 on the actuating arm 102 of the microswitch 98, providing a signal to discontinue the inflation of the container.

Figure 7:
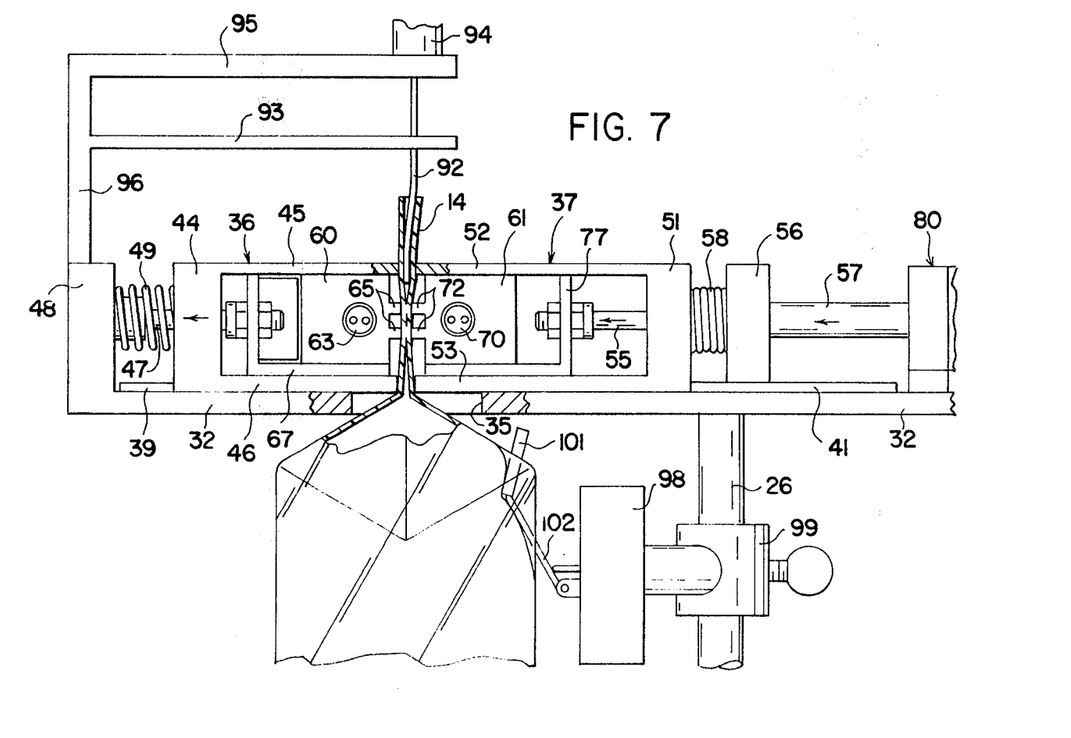
FIG. 7 is a side elevational view similar to FIGS. 5 and 6 showing the machine as the container is being sealed.

After the microswitch 98 signals that the container 12 has been inflated, the machine begins the sealing operation as shown in FIG. 7. In this operation, the sealing member 61 is moved toward the other sealing member 60 until the sealing ribs 65 and 72 contact and seal the upper container portion 14. The forward movement of the sealing member 61 is accomplished by secondary actuation of the double pneumatic cylinder 80. The pneumatic line 88 supplies air to the chamber 89 of the cylinder 80, advancing the piston 82 and the attached piston rod 57, which moves the bar 56 and the rods 55 further forward. The forward motion of the rods 55 pushes the bracket 77 and the attached sealing member 61 forward toward the other sealing member 60. The sealing members 60 and 61 are maintained in the sealing position together against the upper container portion 14 for a predetermined period of time necessary to produce the seals 18 and 19 in the upper container portion 14. This period of time is referred to as the "dwell time." Since the movable upper clamping plate 52 already firmly abuts the other upper clamping plate 45 and cannot move further forward, the movement of the bar 56 and the rods 55 is absorbed by the spring 58 and does not affect the member 37.

Figure 8:
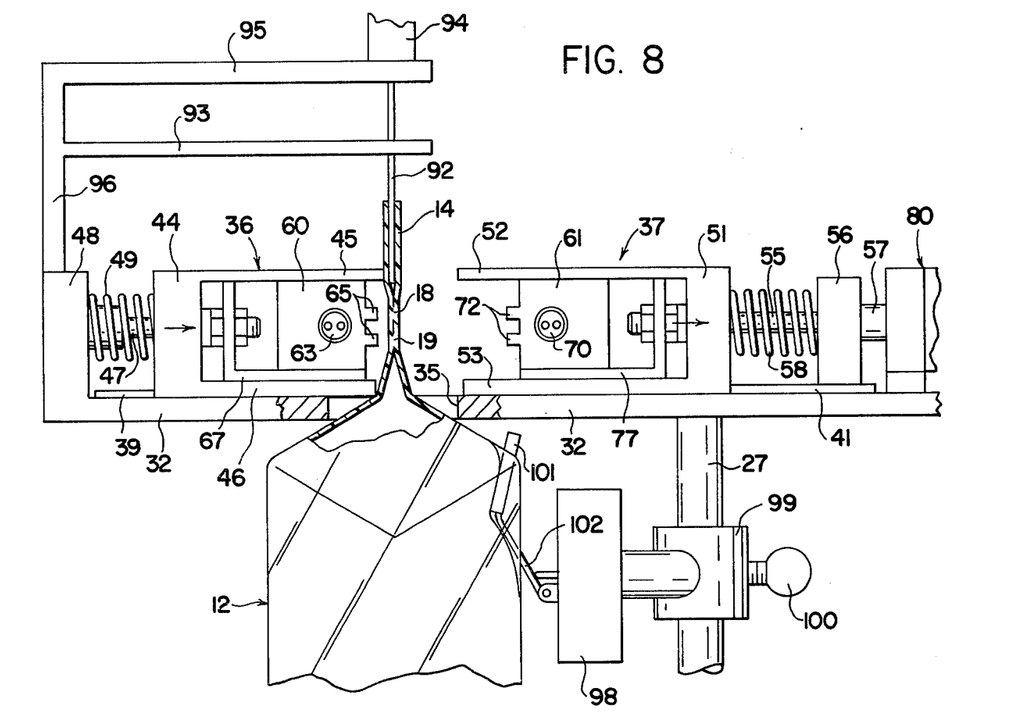
FIG. 8 is a side elevational view similar to FIGS. 5, 6 and 7 showing the machine after the container has been sealed with the clamping and sealing means retracted.

After the sealing operation is completed, the supply of air through the hose 94 and the tube 92 is shut off, and the clamping and sealing means 33 are retracted as shown in FIG. 8. The retraction is accomplished by supplying air through the pneumatic line 90 to the chamber 91 in front of the piston 82. At the same time, the lines 86 and 88 are vented, exhausting the chambers 87 and 89. The increasing supply of air in the chamber 91 causes the piston 82 to retract, engaging the rod 84 which causes the piston 83 also to retract. The retraction operation of the piston 82 and the attached piston rod 57 pulls back the bar 56 and the rods 55 along with the members 37 and 61. When the plates 52 and 53 and the sealing element 61 are fully retracted, the container 12 can be removed from the machine. It may be necessary to hold the upper container portion 14 closed below the lower seal 19 for a short period of time after the sealing operation in order to prevent the pressure within the inflated container 12 from opening the newly formed seals 19 and 18.

Figure 9:
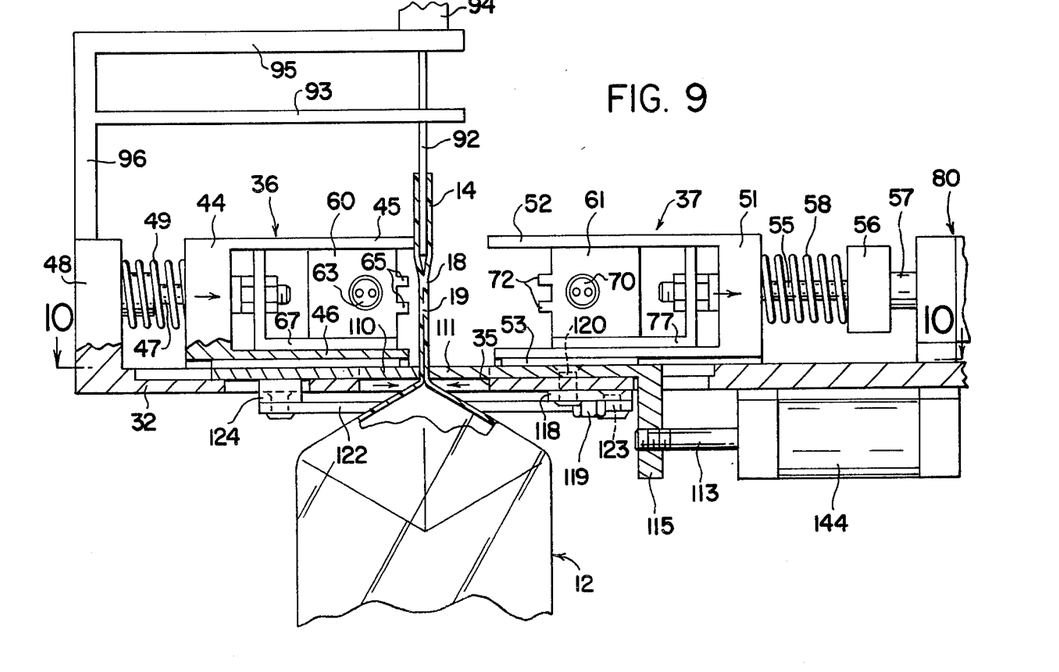
FIG. 9 is a side elevational view similar to FIG. 8 of another embodiment of the inflater sealer machine of the present invention having a lower clamping plate to protect the seal as it cools.
Figure 10:
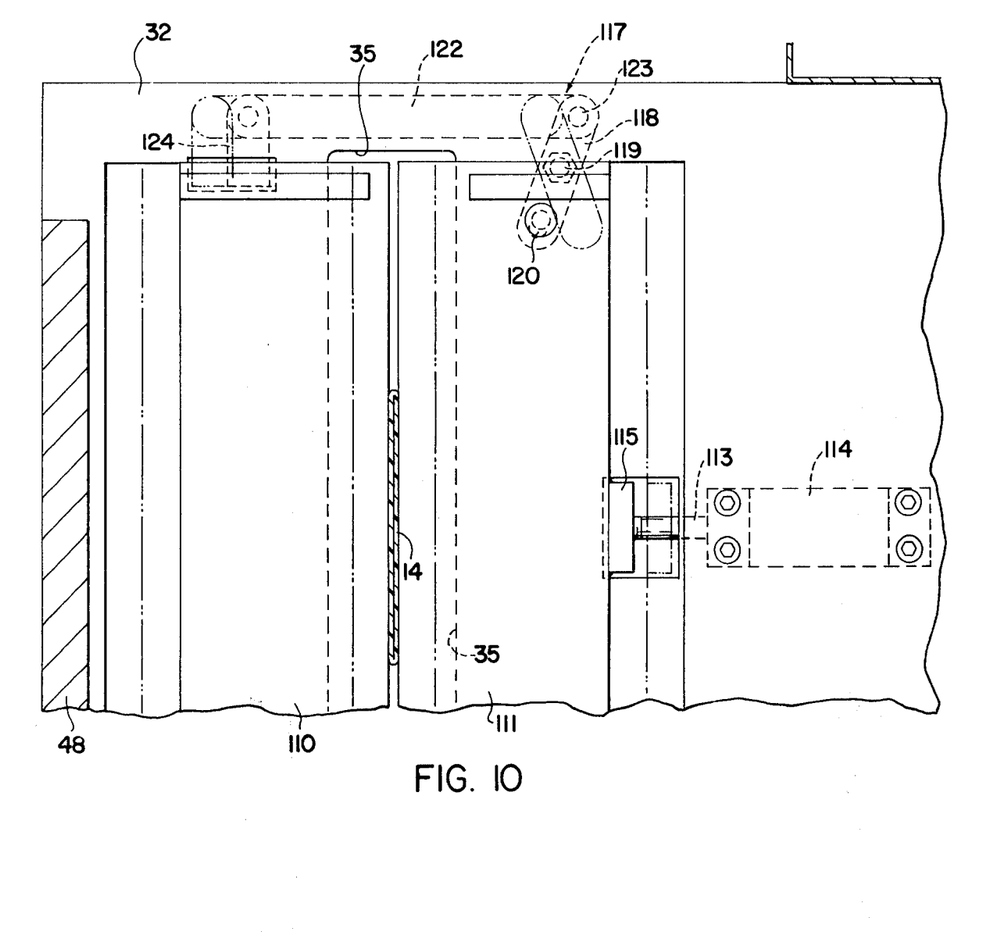
FIG. 10 is a top plan view of the machine of FIG. 9 taken along line 10—10 of FIG. 9.

The clamping of the upper container portion 14 below the lower seal 19 until the seal has cooled may also be performed automatically by an additional pair of clamping plates, as shown in an alternative embodiment of the invention in FIGS. 9 and 10. The lower clamping plates 110 and 111 are mounted below the lower positioning plates 46 and 53 and above the plateform 32 on either side of the opening 35. The clamping plate 111 is connected to a piston rod 113 of a pneumatic cylinder 114 by means of a flange 115. As the clamping plate 111 is advanced by actuation of the cylinder 114, corresponding advancement of the other clamping plate 110 is accomplished by means such as a scissors assembly 117 (FIG. 10) comprising a pivotal member 118 mounted to the platform 32 by a pin 119 and attached to the plate 111 by a pin 120. The other end of the pivotal member 118 is attached to a bar 122 by a pin 123. The bar 122 is connected to the plate 110 by a member 124. Upon actuation of the pneumatic cylinder 114 and advancement of the piston rod 113, the plates 110 and 111 are moved together by the assembly 117, as represented in FIG. 10, wherein the advanced position of the elements is shown in full lines and the retracted position is shown in broken lines.

Figure 11:
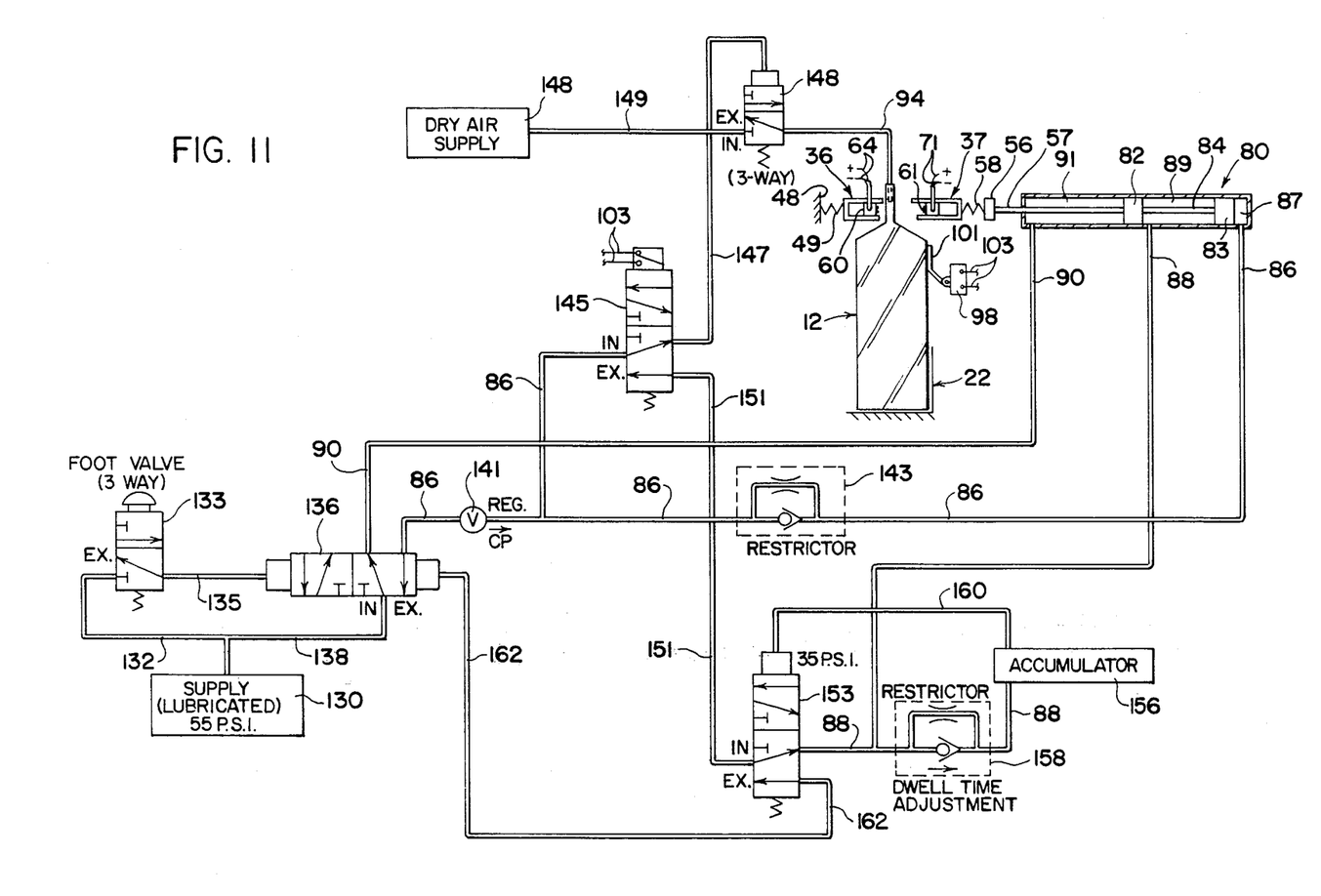
FIG. 11 is a schematic drawing of the preferred pneumatic control system for the machine of the present invention.

The preferred pneumatic control system for operating the inflater sealer machine of FIGS. 3–8 is shown in FIG. 11. The pneumatic system requires a supply 130 of lubricated air, preferably at about 55 psi. The supply 130 is connected by a line 132 to a mechanically operated foot control valve 133 from which the sequence of the machine commences. A pilot line 135 which is connected to the other side of the valve 133, is normally vented when the valve 133 is in its neutral position. Upon actuation of the foot valve 133, the flow of air connected from the line 132 through the valve 133 into the pilot line 135 which is connected to the actuating end of a control valve 136. The pneumatic supply 130 is connected to one side of the valve 136 by a supply line 138. Connected to the other side of the valve 136 are the lines 86 and 90. The line 90 is connected to the chamber 91 at the forward end of the cylinder 80. When the valve 136 is in its normal position (as shown in FIG. 11) the line 86 is vented and the line 90 is connected to the supply line 138, so that the chamber 91 is filled and the piston 82 is fully retracted. When the foot valve 133 is actuated and the pivot line 135 is energized, the valve 136 is actuated (to the right in FIG. 11) so that the supply line 138 is connected to the line 86.

A regulator 141 is located on the line 86 downstream from the valve 136. On the downstream side of the regulator 141, the line 86 has a check orifice or restrictor 143. On the downstream side of the restrictor 143, the line 86 is connected to the chamber 87 of the cylinder 80 behind the piston 83.

The line 86 is also connected to a solenoid control valve 145. The solenoid of the valve 145 is energized by the signal supplied by the microswitch 98 through the wires 103. When the valve 145 is in its normal position (as shown), the line 86 is connected to the pilot line 147 which operates a valve 148. The valve 148 controls the flow of dry air used to inflate the container. The dry air from a supply source 148 is connected to the valve 148 by a supply line 149. When the valve 148 is actuated, the supply line 149 is connected to the hose 94.

When the solenoid control valve 145 is actuated, the line 86 is connected to a line 151 which is connected to a pilot control valve 153. When the valve 153 is in its normal position (as shown), the line 151 is connected to the line 88 which is connected to the chamber 89 of the cylinder 80 between the pistons 82 and 83. The line 88 is also connected to an accumulator or volume 156. Upstream of the accumulator 156 on the line 88 is an adjustable restrictor 158 which serves as a dwell time adjustment, as explained hereinafter.

The output of the accumulator 156 is connected to the actuating end of the valve 153 by a pilot line 160. When the valve 153 is actuated, the line 88 is vented and the line 151 is connected to a pilot line 162 which is connected to the other actuating end of the valve 136.

The sequence of operation of the pneumatic system of FIG. 11 begins with the valve 136 in its normal position with the line 90 connected to the supply line 138 so that the chamber 91 of the cylinder 80 is filled and the sealing and clamping means are fully retracted. The other valves 133, 145, 148 and 158 are also in their normal positions (as shown) with the hose 94 and lines 86, 88, 135, 151 and 162 vented.

After the container 12 has been placed in the tray 22, the foot valve 133 is actuated, and air flows through the line 132 to the pilot line 135 and actuates the valve 136 (to the right as shown). With the actuation of the valve 136, air flows from the supply source 130 through the supply lines 138 through the actuated valve 136 to the lines 86. After passing through the regulator 141 and the restrictor 143, the air in the line 86 enters the chamber 87 in the cylinder 80, pushing the piston 83 forward and closing the clamping plates over the upper portion 83 forward and closing the clamping plates over the upper portion of the container 12. The air also passes through the line 86 through the line 86 through the valve 145 and into the pilot line 147, actuating the valve 148. When the valve 148 is actuated, dry air flows from the supply source 148 through the hose 94, inflating the container 12.

When the container 12 becomes inflated, the microswitch 98 actuates, sending a signal through the electrical lines 103 and actuating the solenoid control valve 145. The actuation of the valve 145 vents the pilot line 147, deactuating the valve 148 and shutting off the supply of dry air to the hose 94. The actuation of the valve 145 also connects the line 151 to the line 88, so that air flows through line 151 from the lines 138 and 86. Since the line 151 is connected to the line 88 through the valve 153, air flows from the line 151 through the line 88 into the chamber 89 behind the piston 82 in the cylinder 80. As the chamber 89 fills, the piston 82 moves forward, advancing the sealing element which seals the upper portion of the container 12. At the same time, the air in the line 88 also flows through the adjustable restrictor 158 and begins filling the accumulator 156 and the pilot line 160 connected to the control end of the valve 153. As previously mentioned, the restrictor 158 and the accumulator 156 serve as a dwell time adjustment, because the period of time necessary to fill the accumulator 156 and build up sufficient pressure in the line 160 provides a delay time during which the sealing elements engage the upper portion of the container 12 to seal the container. The length of the sealing dwell time can be adjusted by changing the size of the orifice in the adjustable restrictor 158. With a smaller orifice, the time necessary to fill the accumulator increases, and the dwell time increases. With a large orifice, the accumulator fills faster and the dwell time decreases.

After sufficient dwell time, when the container seal has been completed, the accumulator 156 is filled, and there is sufficient air pressure in the pilot line 160 to actuate the valve 153. When the valve 153 actuates, the air in the line 151 flows into the line 162. The air in the line 162 returns the valve 136 to the normal position shown in FIG. 11, so that the line 86 is vented and air flows from the supply line 138 to the line 90 filling the chamber 91 and retracting the piston 82. At the same time, the chamber 89 is exhausted through the line 88, which is vented when the valve 153 is actuated. When the sealed container 12 is removed from the tray 22, the microswitch 98 deactivates, and the solenoid control valve 145 returns to its normal position. The pneumatic control system is then in its initial state, ready to begin another sequence of operations.

While the machine and the pneumatic control system have been described with respect to preferred embodiments, these are shown for the purpose of illustration and not limitation. It is understood that other embodiments may be employed by those skilled in the art without departing from the spirit and scope of the invention as defined by the following claims.

What is claimed is:

1. A machine for inflating and sealing a container comprising:
    a pair of clamping means capable of moving together for holding portions of the container together;
    stationary means extending into the clamping means for inflating the container;
    a pair of sealing means adjacent to the clamping means and capable of moving together to seal together the portions of the container while inflated; and
    a control system having means for sequentially moving the pair of clamping means together and moving the pair of sealing means together, the sequential moving means including a fluid cylinder having piggy-back pistons.

2. A machine for inflating and sealing a container comprising:
    a pair of clamping means capable of moving together for holding portions of the container together;
    stationary means extending into the clamping means for inflating the container;
    a pair of sealing means adjacent to the clamping means and capable of moving together to seal together the portions of the container while inflated; and
    a control system having means for sequentially moving the pair of clamping means together and moving the pair of sealing means together, the control system also having adjustable means for delaying the period of time during which the pair of sealing means are together.

3. A machine for inflating and sealing a container comprising:
    a frame;
    a tray supported on the frame for supporting the container;
    a pair of clamping members supported on the frame, the clamping members capable of moving together to hold portions of the container together;
    a tube fixed on the frame and extending into the clamping means to inflate the container, the tube connected to a supply of gas;
    a pair of sealing members adjacent to the clamping members, the sealing members having extending sealing ribs and heating elements therein, the sealing members capable of moving together to seal together the portions of the container while the container is inflated; and
    a control system including a fluid cylinder having piggy-back pistons to sequentially move the clamping members together and move the sealing members together, valve means connected to the tube to actuate the inflation of the container, and an adjustable means for delaying the period of time during which the sealing members are together.

4. A machine for inflating and sealing a container comprising:
    a pair of clamping means capable of moving together for holding portions of the container together;
    stationary means extending into the clamping means for inflating the container with gas;
    a pair of sealing means adjacent to the clamping means and capable of moving together to seal together the portions of the container while inflated;
    a control system having means for sequentially moving the pair of clamping means together and moving the pair of sealing means together, the control system also having means for actuating the inflating means; and
    means for physically sensing the expansion of the container as it is inflated, said sensing means operatively connected to said actuating means to halt the flow of gas when the container is inflated.

5. A machine for inflating and sealing a container comprising:
- a pair of clamping means capable of moving together for holding portions of the container together;
- stationary means extending into said clamping means for inflating the container;
- a pair of sealing means adjacent to and slidably mounted with respect to said clamping means and capable of moving together to seal together the portions of the container while inflated, and
- a control system having means for sequentially moving first the pair of clamping means together and moving subsequently the pair of sealing means together,
- wherein said sealing means is directly mounted to said sequential moving means, and each of said pair of clamping means is spring mounted with respect to said sealing means to said sequential moving means, said springs being compressed by said sequential moving means to move said sealing means together after said clamping means are moved together.

* * * * *